United States Patent [19]
Guy

[11] Patent Number: 6,109,641
[45] Date of Patent: Aug. 29, 2000

[54] FIRST-IN/FIRST-OUT TRACTOR AND SEMI-TRAILER CARGO TRANSFER SYSTEM

[75] Inventor: Yoram Guy, Ann Arbor, Mich.

[73] Assignee: Tenneco Automotive Inc., Lake Forest, Ill.

[21] Appl. No.: 09/100,060

[22] Filed: Jun. 19, 1998

[51] Int. Cl.[7] .................................................. B62D 53/06
[52] U.S. Cl. ................................. 280/423.1; 296/190.03; 296/50; 296/181
[58] Field of Search .............................. 280/400, 423.1, 280/432, 434, 474; 296/181, 190.03, 50

[56] References Cited

U.S. PATENT DOCUMENTS

| | | | |
|---|---|---|---|
| 3,721,358 | 3/1973 | Brock .................................... | 280/423.1 |
| 3,759,405 | 9/1973 | Barry . | |
| 3,806,159 | 4/1974 | Self et al. ............................ | 280/423.1 |
| 3,837,673 | 9/1974 | McCarthy . | |
| 3,874,702 | 4/1975 | Hall ...................................... | 280/423.1 |
| 3,881,749 | 5/1975 | Berends ............................... | 280/423.1 |
| 4,379,585 | 4/1983 | Strick . | |
| 4,403,803 | 9/1983 | Szendrodi et al. ..................... | 296/179 |
| 4,688,976 | 8/1987 | Rowley et al. . | |
| 4,832,420 | 5/1989 | O'Neil et al. ........................ | 280/423.1 |
| 4,856,843 | 8/1989 | Elliott . | |
| 4,871,182 | 10/1989 | Altherr et al. .......................... | 280/434 |
| 4,875,821 | 10/1989 | Oren . | |
| 5,326,213 | 7/1994 | Roberts . | |
| 5,464,241 | 11/1995 | Flater ..................................... | 280/434 |
| 5,785,341 | 7/1998 | Fenton ................................. | 280/423.1 |

Primary Examiner—Robert P. Olszewski
Assistant Examiner—Steven B. McAllister
Attorney, Agent, or Firm—Harness, Dickey & Pierce, PLC

[57] ABSTRACT

A truck design and load/unload configuration includes a tractor and an enclosed semi-trailer. The enclosed semi-trailer includes front and rear full size cargo doors or openings. The cargo loaded into the semi-trailer first is assured to be the cargo that is unloaded from the semi-trailer first.

10 Claims, 4 Drawing Sheets

FIRST-IN/FIRST-OUT TRACTOR AND SEMI-TRAILER CARGO TRANSFER SYSTEM

BACKGROUND OF THE INVENTION

1. Technical Field

The present invention generally relates to load transport vehicles, and a method for loading and unloading same. More particularly, the present invention relates to a tractor and an enclosed semi-trailer which can be loaded from a front end and unloaded from a rear end or vice versa, and method of loading and unloading same having first-in/first-out load/unload capabilities.

2. Discussion

An efficient and cost saving transportation system is essential to the operation of modern industrial societies. Through the centuries, the methods of transporting goods and materials from one location to a distant location have evolved to today where millions of tons of goods and materials are carried upon highways by tractor and semi-trailer rigs which have become familiar sights on the world's highways and byways.

A conventional tractor and semi-trailer rig is so named because the trailer relies on the tractor to carry part of its weight. A conventional tractor and enclosed semi-trailer van rig has standard rear loading doors which require the loading/unloading of the tractor and semi-trailer rig in a last-in/first-out sequence, that is, the cargo which is loaded last is the cargo that is unloaded first. This last-in/first-out sequence or loading/unloading means that for specific cargo which is to be unloaded first, that specific cargo must be loaded last. Manufacturing companies have revised their shipping and receiving procedures to minimize their inventory costs and have gone to some type of a just-in-time procedure. When the product being received is designed specifically for a particular application, the just-in-time/in-line-sequencing procedure is utilized. When using this just-in-time/in-line-sequencing procedure, it is necessary to use assemblies, and thus unload these assemblies, in the order that they were manufactured. For the manufacturer or shipper, this requires a rather substantial shipping staging area or loading dock in order to temporarily store the assemblies that were manufactured first. Storage for the first manufactured assemblies is required until racks containing the final group of manufactured assemblies to be shipped are filled and loaded on the tractor and semi-trailer rig first thus allowing the first manufactured assemblies to be loaded last. This loading/unloading procedure is required for a just-in-time/in-line-sequencing requirement. Such a loading/unloading method is inefficient and unnecessarily time consuming due to the multiple handling and movement of the manufactured assemblies. It is also space consuming and promotes out of sequence loading errors.

Some conventional tractor and semi-trailer rigs include loading doors located on the side. Such full length side loaded trailers require loading from road level as opposed to loading from a standard loading dock height, or if loaded from a loading dock, they require a rather large loading dock area. The space constraints associated with loading a full length side loaded tractor and semi-trailer rig also make it difficult to protect the workers and the forklift operators from inclement weather conditions.

A conventional tractor and semi-trailer rig is rather large and cumbersome. Visibility for the driver is often limited. The maneuverability of such large rigs into a small loading dock area where visibility is often limited is time consuming, tedious and difficult. Even drivers having a vast amount of experience and skill exhibit driver error from time to time under these difficult conditions.

Therefore, numerous disadvantages currently exist in load transport vehicles, and in the methods for loading and unloading same. Continued development in the transportation industry has been directed towards simplifying the loading/unloading of these vehicles and eliminating the above described disadvantages.

SUMMARY OF THE INVENTION

It is the principal object of the present invention to provide a truck design and load/unload configuration having first-in/first-out load/unload capabilities.

A related object of the present invention is to provide a truck design and load/unload configuration which eliminates the need to load/unload the semi-trailer in reverse sequence thereby reducing the risk of out of sequence loading errors and increasing load/unload time efficiency.

It is another object of the present invention to provide a truck design and load/unload configuration which allows for the substantial reduction of or elimination of large shipping/staging areas.

A related object of the present invention is to provide a truck design and load/unload configuration which allows for loading and unloading at standard dock heights, cost effective full weather protection for workers and cargo, and substantially reduced forklift operator time.

It is still yet another object of the present invention to provide a truck design and load/unload configuration which allows for quick and easy maneuverability and better driver visibility.

It is another object of the present invention to provide a truck design and load/unload configuration which allows for automatic passive mechanical engagement of stabilization pads to ensure trailer roll stability during loading and/or unloading.

In one form, the present invention provides the art with a method of loading and unloading a semi-trailer. The method of the present invention includes the general steps of loading cargo into the semi-trailer and unloading cargo from the semi-trailer, ensuring that cargo first loaded is the cargo that is first unloaded.

Additional benefits, along with other advantages and objects of the present invention will become apparent to those skilled in the art from a reading of the subsequent detailed description, appended claims and accompanying drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
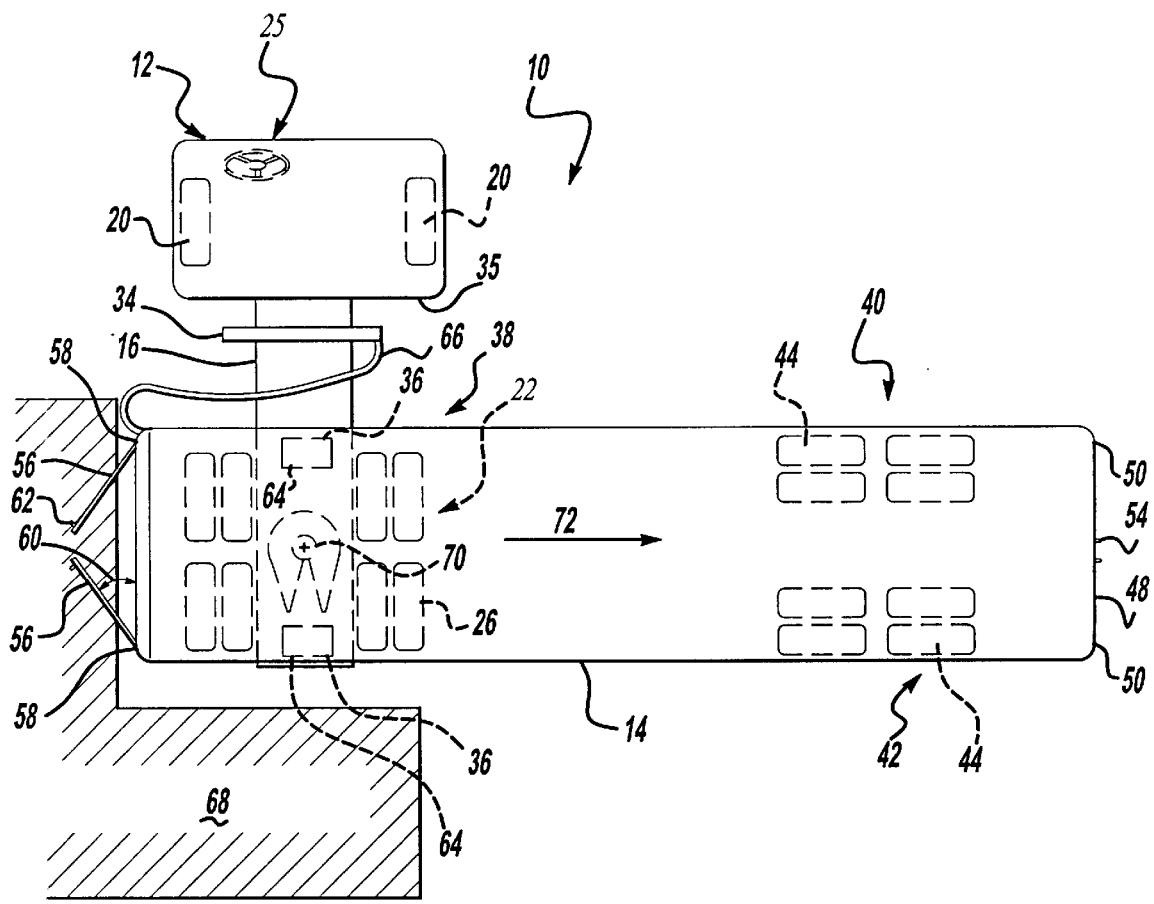
FIG. 1 is a top view of an embodiment of a tractor and semi-trailer in accordance with the principles of the present invention positioned at a loading dock.

Referring now to the drawings in which like reference numerals designate like or corresponding parts throughout the several views, there is shown in FIGS. 1–4 a tractor and semi-trailer which incorporates the first-in/first-out load/unload capability in accordance with the present invention and which is designated generally by the reference numeral 10. The truck design and load/unload configuration 10 includes a tractor 12 interconnected to a semi-trailer 14 by a conventional "fifth wheel"-type hitch 15 which provides a means for suitably connecting the tractor 12 to the semi-trailer 14. The tractor 12 and the fifth wheel hitch 15 are partially supported and carried off a ground surface 18 by wheels 20 and a wheel assembly 22. The wheels 20 are usually mounted on a front axle 24 located at a front end 25 of the tractor 12. The wheel assembly 22 uses either a single or a multiple axle assembly, including wheels 26 mounted on one or more axles 28 located at a rear part 30 of a tractor frame 16. A front end 32 of the tractor frame 16 includes a tractor cab rear protective wall 34 which compensates for any reduced semi-trailer front wall structure and prevents the intrusion of objects into a tractor cab 35. Also included at the rear part 30 of the tractor frame 16 may be trailer stabilization pads 36. In the preferred embodiment, two stabilization pads 36 are disposed along the centerline of the rear part 30 of the tractor frame 16, one in front of and one behind the fifth wheel hitch 15, equal distances from its yaw pivot.

The semi-trailer 14 includes a front end 38 and a rear end 40. The rear end 40 of the semi-trailer 14 is supported and carried off the ground surface 18 by a wheel assembly 42. The wheel assembly 42 includes wheels 44 mounted on one or more axles 46. The rear end 40 of the semi-trailer 14 also includes rear cargo doors 48. The rear cargo doors 48 are mounted on suitable hinges 50 for movement about a vertical axis, generally illustrated by the double headed arrow 52. The rear cargo doors 48 of the semi-trailer 14 also include standard locking handles 54. While the rear cargo doors 48 are illustrated as being mounted for pivotal movement on a vertical axis, it will be appreciated that the rear cargo doors 48 might also be mounted for pivotal movement about a horizontal axis such that they might swing upward or downward depending on the specific configuration utilized, or alternatively as a retractable door assembly. Thus, any type of door assembly is contemplated herein, or alternatively a trailer having no doors whatsoever. In the preferred embodiment, the rear cargo doors 48 are mounted on the semi-trailer 14 so as to provide little, if any, interference during loading and unloading procedures at the rear end 40 of the semi-trailer 14.

The front end 38 of the semi-trailer 14 is supported and carried off the ground surface 18 by the fifth wheel hitch 15 of the tractor 12. The front end 38 of the semi-trailer 14 also includes front cargo doors 56. The front cargo doors 56 of the semi-trailer 14 are mounted on suitable hinges 58 for movement about a vertical axis, generally illustrated by the double headed arrow 60. The front cargo doors 56 of the semi-trailer 14 also include standard locking handles 62. While the front cargo doors 56 of the semi-trailer 14 are illustrated as being mounted for pivotal movement on a vertical axis, it will be appreciated that the front cargo doors 56 might also be mounted for pivotal movement about a horizontal axis such that they might swing upward or downward depending on the specific configuration utilized, or alternatively as a retractable door assembly. Thus, any type of door assembly is contemplated herein, or alternatively a trailer having no doors whatsoever. In the preferred embodiment, the front cargo doors 56 are mounted on the semi-trailer 14 so as to provide little, if any, interference during loading and unloading procedures at the front end 38 of the semi-trailer 14.

Figure 4:
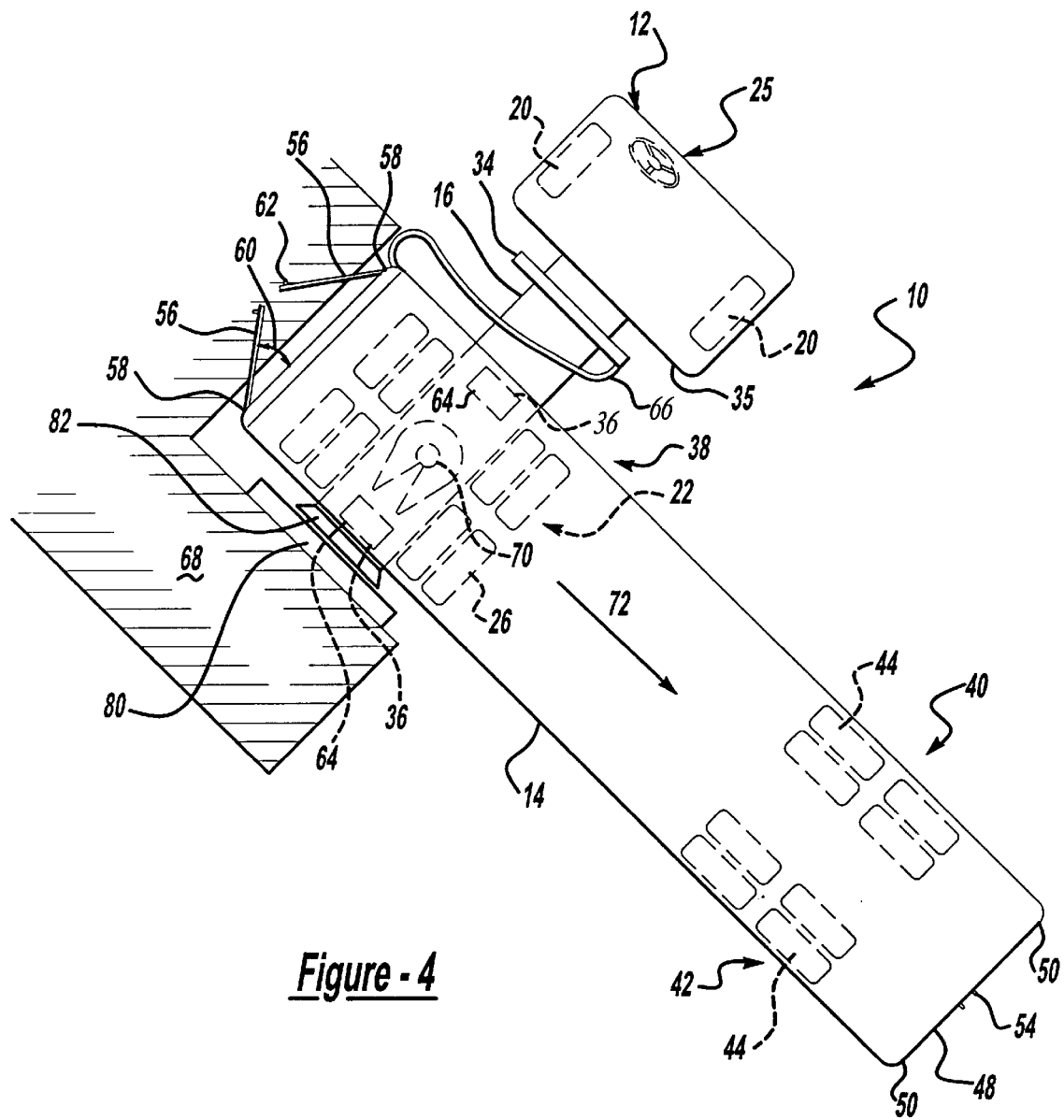
FIG. 4 is a top view of the tractor and semi-trailer shown in FIG. 1 positioned at an alternative loading dock.

The front end 38 of the semi-trailer 14 may also include trailer stabilization pads 64. The trailer stabilization pads 64 located at the front end 38 of the semi-trailer 14 are spaced laterally and arranged so that they are capable of engaging trailer stabilization pads 36 located on the tractor frame 16 during loading or unloading procedures as shown in FIG. 1 and FIG. 4. The front end 38 of the semi-trailer 14 also includes side mounted air and electric hook ups 66 which are connected to and between the front end 38 of the semi-trailer 14 and the tractor 12. The side mounted air and electric hook ups 66 are positioned in such a way as to freely swing out of the way during loading and unloading procedures as shown in FIG. 1 and FIG. 4.

Figure 2:
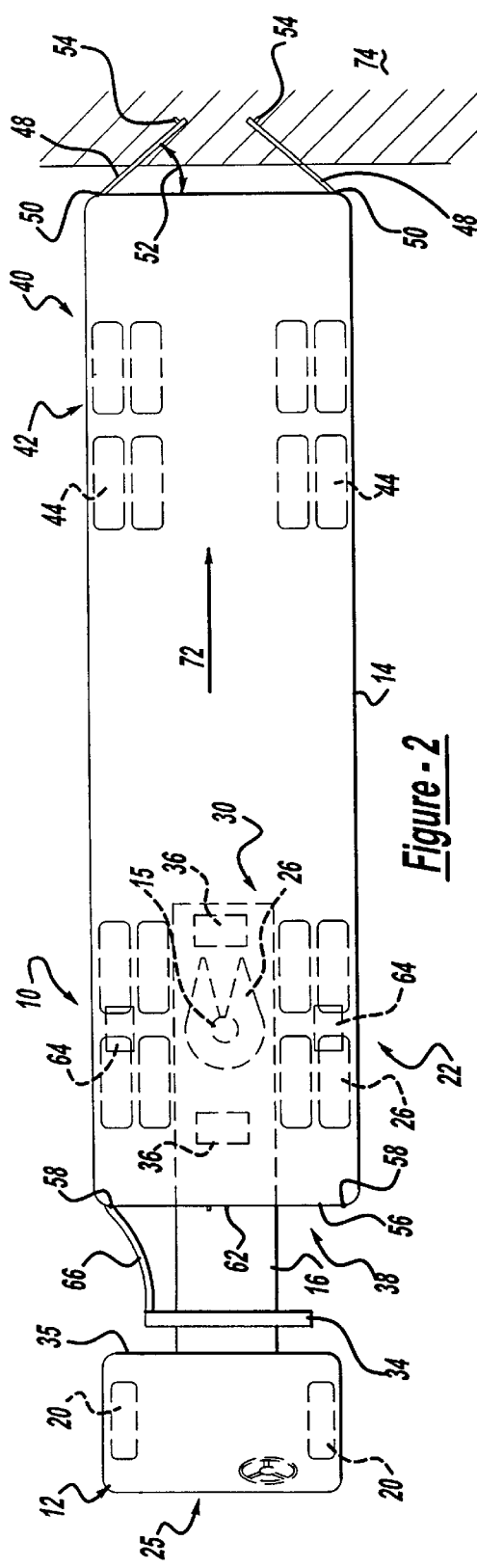
FIG. 2 is a top view of the tractor and semi-trailer shown in FIG. 1 positioned at an unloading dock.
Figure 3:
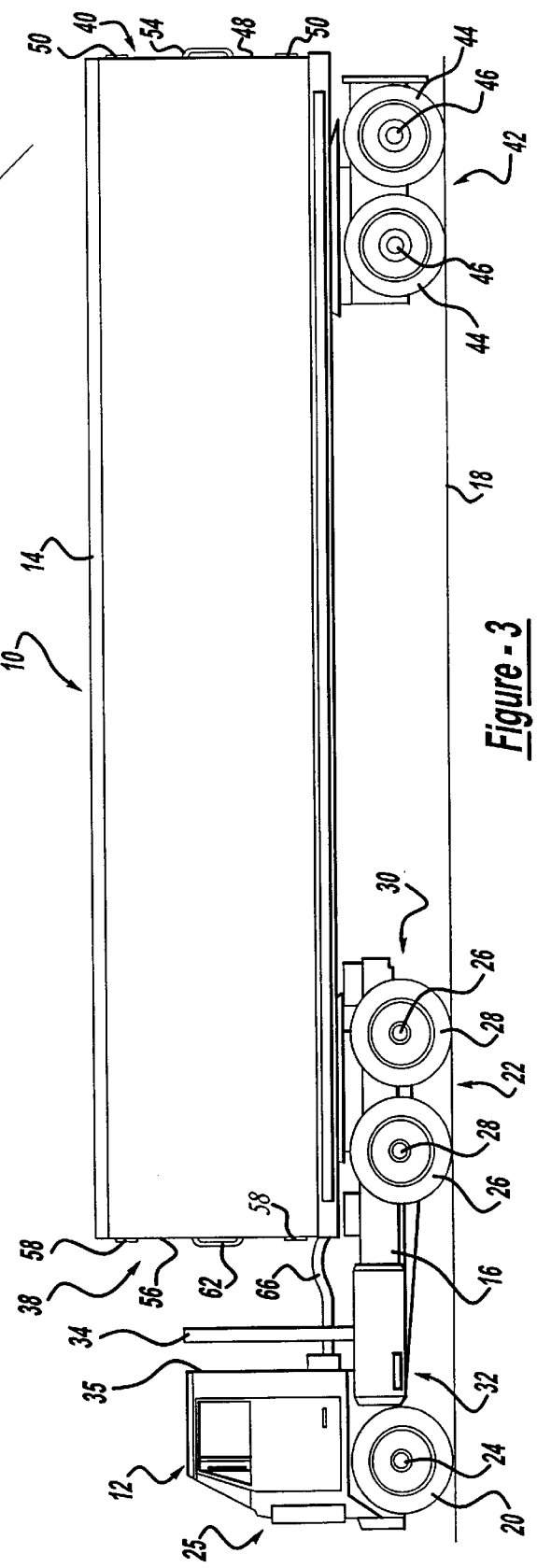
FIG. 3 is a side elevational view of the tractor and semi-trailer shown in FIG. 2.

The operation of the truck design and load/unload configuration 10 is shown in FIG. 1 and FIG. 2. FIG. 1 illustrates the configuration for front loading and unloading, while FIG. 2 illustrates the configuration for rear loading and unloading.

Referring now to FIG. 1 and FIG. 4, saw-tooth shaped loading docks 68 and 69 are illustrated. While the saw-tooth shaped loading docks 68 and 69 are illustrated, those skilled in the art will realize that this shape of loading dock is not required in order for the current invention to be utilized. The semi-trailer 14 is positioned such that the tractor 12 and the semi-trailer 14 are in an approximately 90° jack-knife position with respect to one another. As used herein, jack-knife refers to a position where the tractor 12 is articulated relative to the semi-trailer 14 such that the tractor 12 does not interfere with the front cargo doors 56 during loading and unloading. For example, as shown in FIG. 1 and FIG. 4, the tractor 12 is articulated approximately 90° to the semi-trailer 14. Such positioning is accomplished by the tractor driving forward and turning until there is approximately 45° of articulation, and then backing up while steering in the opposite direction until there is approximately 90° of articulation. This positioning provides for clear access to the front cargo doors 56 at the front end 38 of the semi-trailer 14. In the preferred embodiment, in order to maximize driver visibility during maneuvering, the jack-knife direction of the tractor 12 is opposite to the driver side. Thus, a left hand drive tractor is articulated to the right as shown in FIG. 1 and FIG. 4. A right hand drive tractor, as found in the United Kingdom, is articulated to the left (not shown).

Figure 5:
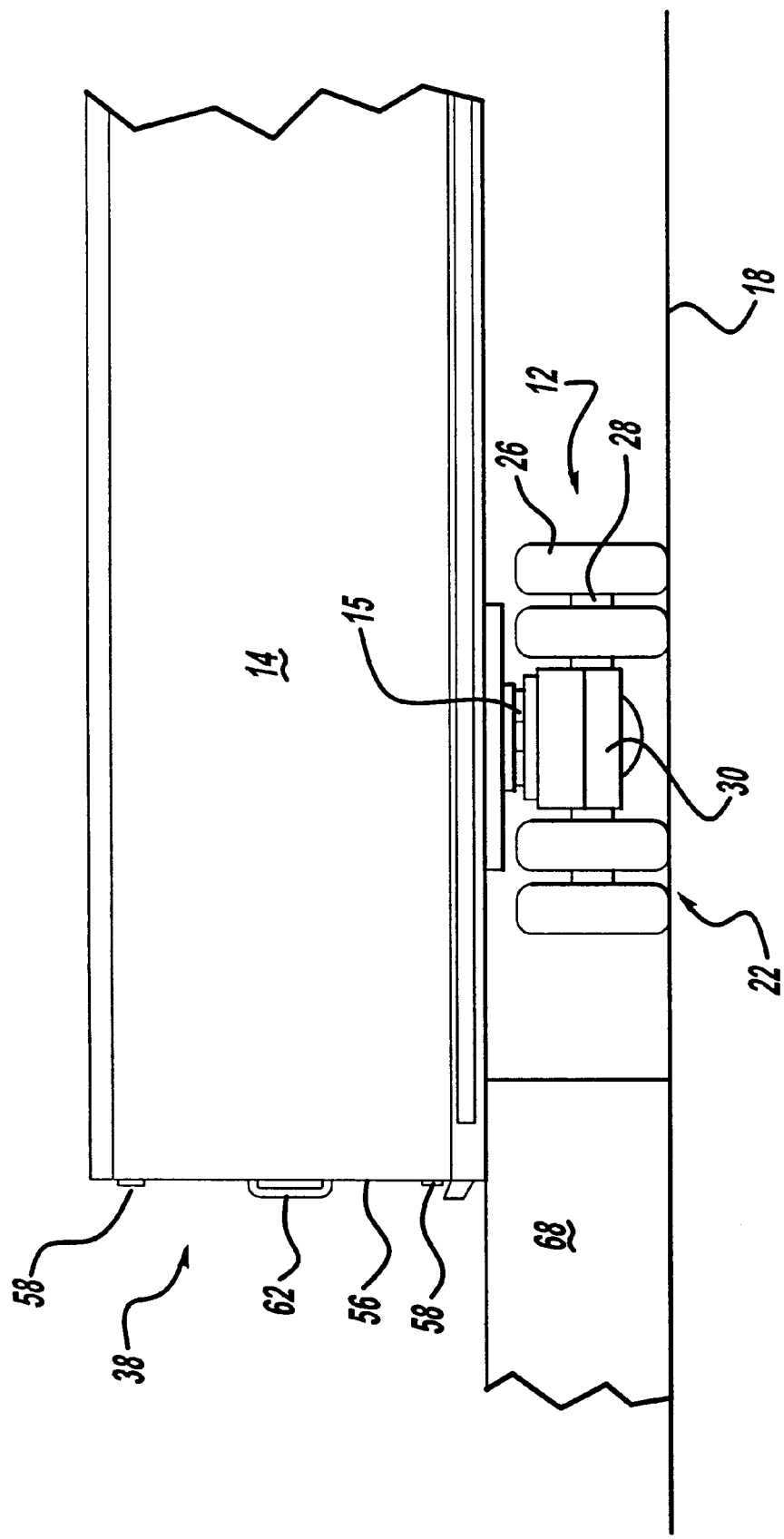
FIG. 5 is a partial side elevational view of a tractor and semi-trailer according to another embodiment of the present invention.

Measures are provided for the tractor 12 and the semi-trailer 14 while in their jack-knife position to ensure trailer roll stability. One measure available is to discharge the rear air springs (not shown) of the semi-trailer 14 so that the semi-trailer 14 rests on the jounce stops of the suspension system. This will provide stability to the rear end of the semi-trailer 14 and also provide some stability to the front end 38. Another measure available is a passive mechanical engagement of the tractor 12 and the semi tractor 14 so as to ensure trailer roll stability. The jack-knife position of tractor 12 and semi-trailer 14 causes passive mechanical engagement between the stabilization pads 36 on the tractor 12 and the stabilization pads 64 on the semi-trailer 14. These pads 36 and 64 engage or come in close proximity with one another as shown in FIG. 1 and FIG. 4 providing means for stabilizing trailer roll. This will provide stability to the front end 38 of the semi-trailer 14 and also provide some stability to the rear end 40. When the stabilization pads 36 and 64 are used in combination with the discharging of the rear air-springs of the semi-trailer 14, both front end 38 and rear end 40 will be stabilized. As an alternative to providing stabilization pads 36 and 64, it may be possible to take advantage of the kingpin setback of the semi-trailer 14. The kingpin setback is defined as the distance between the pivot or kingpin axis of the fifth wheel hitch 15 and the front end 38 of the semi-trailer 14. Referring now to FIG. 5, when tractor 12 is in the jack-knifed position, the kingpin setback for the semi-trailer 14 may be sufficient for allowing the front end 38 of semi-trailer 14 to extend above the dock 68 or 69. Once in this position, the air springs of tractor 12 can be discharged allowing the front end 38 of semi-trailer 14 to rest on the upper surface of the dock 68 or 69. This will provide stability to the front end 38 of the semi-trailer 14 and also provide some stability to the rear end 40. When the discharging of the air springs of the tractor is used in combination with the discharging of the rear air-springs of the semi-trailer 14, both front end 38 and rear end 40 will be stabilized.

In one embodiment, as illustrated in FIG. 1, the semi-trailer 14 is positioned at the saw-tooth shaped loading dock 68 in the jack-knife position such that the stabilization pads 36 are engaged with, or in close proximity to, the stabilization pads 64 to ensure trailer roll stability. The semi-trailer 14 is loaded from a standard dock height. Cargo is loaded through the front full size cargo doors 56 at the front end 38 of the semi-trailer 14. Thereafter, this cargo is loaded in the direction illustrated by arrow 72 in FIG. 1. This loading procedure ensures that the cargo first completed is immediately loaded from the loading dock directly into the semi-trailer 14 and placed at the rear most available space in the semi-trailer 14.

Referring now to FIG. 2, the unloading position is illustrated. The tractor 12 and the semi-trailer 14 are positioned at an unloading dock 74. The unloading of cargo from the semi-trailer 14 will take place through the rear full size cargo doors 48 at the rear end 40 of the semi-trailer 14. The cargo is unloaded in the direction illustrated by arrow 72 in FIG. 2 which is the same direction in which the cargo was initially loaded. This load/unload configuration ensures that the cargo first loaded will be the cargo first unloaded. The unloading of the semi-trailer 14 as described can take place at any conventional unloading dock since the inventive features of the truck design and load/unload configuration 10 are transparent to the unloading operation or the unloading dock configuration.

While the loading of cargo through the front cargo doors 56 and the unloading of cargo through the rear cargo doors 48 is illustrated, those skilled in the art will realize that the rear cargo doors 48 may be used for loading (opposite to the arrow 72 in FIG. 2) while the cargo doors may be used for unloading (opposite to the front arrow 72 in FIG. 1). Such a reversal would still enable the cargo that is loaded first to be the cargo that is unloaded first. The first-in/first-out load/unload capability still results. The present invention provides a unique truck design and load/unload configuration, as well as a unique method of loading and unloading same having first-in/first-out load/unload capabilities which requires minimal modification to existing tractors and semi-trailers. No elaborate, expensive modifications or retrofitting need take place.

In another embodiment, as illustrated in FIG. 4, the semi-trailer 14 is positioned at the saw-tooth shaped loading dock 69 in the jack-knife position such that the stabilization pads 36 are engaged, with or in close proximity to, the stabilization pads 64 to ensure trailer roll stability. The loading and unloading of the semi-trailer 14 is the same as described above for FIG. 1. The dock configuration illustrated in FIG. 4 offers the advantage that a reduced width of driveway or parking lot adjacent to dock 69 is required. In FIG. 1, the semi-trailer 14 extends generally perpendicular to dock 68 requiring the width of the driveway or lot to extend the entire length of the semi-trailer 14 as well as an added width for maneuvering the semi-trailer 14 by tractor 12. In FIG. 1, the semi-trailer 14 extends at an approximate angle of 45° with respect to dock 69, significantly reducing the width of driveway or parking lot required. FIG. 4 also illustrates a bumper 80 which is positioned to engage a bumper 82 on tractor 12 to provide assistance to the driver of the tractor 12 in properly positioning the semi-trailer 14. Bumpers 80 and 82 can also be incorporated in the embodiment shown in FIG. 1 if desired.

While the above detailed description describes the preferred embodiment of the present invention, it should be understood that the present invention is susceptible to modification, variation and alteration without deviating from the scope and fair meaning of the subjoined claims.

What is claimed is:

1. A load transport vehicle comprising:

a tractor having a frame with a hitch secured to said frame;

an enclosed semi-trailer pivotably connected to said hitch of said tractor;

first means for stabilizing said semi-trailer located on said frame, said first stabilizing means being separate from said hitch;

second means for stabilizing said semi-trailer located on said semi-trailer, said tractor being positionable relative to said semi-trailer such that said first stabilizing means is located adjacent said second stabilizing means to provide roll stability between said tractor and said semi-trailer;

a first opening at a front end of said semi-trailer for allowing access to and from said enclosed semi-trailer; and a second opening at a rear end of said semi-trailer for allowing access to and from said enclosed semi-trailer.

2. The load transport vehicle according to claim 1 wherein, said hitch allows said tractor to rotate approximately 90° about said front end of said semi-trailer in both a clockwise and a counterclockwise direction.

3. The load transport vehicle according to claim 1 wherein, said first stabilization means comprises a first pair of stabilizing pads and said second stabilization means comprises a second pair of stabilizing pads and wherein, said first and second pairs of stabilization pads are positioned between said tractor and said semi-trailer to provide roll stability.

4. The load transport vehicle according to claim 1 wherein said tractor includes a rear cab protective wall.

5. The load transport vehicle according to claim 1 further comprising air and electric hook-ups interconnecting said tractor and said semi-trailer, said air and electric hook-ups being mounted such that they swing out of the way when said first opening at said front end of said semi-trailer is opened.

6. The load transport vehicle according to claim 1 wherein said first opening comprises a pair of cargo doors and said second opening comprises a pair of cargo doors.

7. A load transport vehicle comprising:

a tractor having a hitch;

a trailer having a first end and a second end, said first end of said trailer being releasably coupled to said hitch of said tractor;

first means for stabilizing said trailer located on said tractor, said first stabilizing means being separate from said hitch; and second means for stabilizing said trailer located on said trailer, said tractor being positionable in a jack-knifed position such that said first stabilizing means is located adjacent said second stabilizing means to provide roll stability between said tractor and trailer.

8. The load transport vehicle according to claim 7 wherein said tractor is operable to rotate approximately 90° about said first end of said trailer in both a clockwise and a counterclockwise direction.

9. The load transport vehicle according to claim 7 wherein said first stabilizing means includes at least one tractor stabilization pad and said second stabilizing means includes at least one trailer stabilization pad, said at least one tractor stabilization pad and said at least one trailer stabilization pad being positioned between said tractor and said semi-trailer to provide said roll stability.

10. The load transport vehicle according to claim 7 wherein said tractor further includes a rear cab protective wall.

* * * * *

UNITED STATES PATENT AND TRADEMARK OFFICE
CERTIFICATE OF CORRECTION

PATENT NO. : 6,109,641
DATED : August 29, 2000
INVENTOR(S) : Yoram Guy

It is certified that error appears in the above-identified patent and that said Letters Patent is hereby corrected as shown below:

Title Page, [56] Refereneces Cited, Patent 4,832,420, "5/1989" should be --3/1988--

Col. 4, line 52, "semi tractor 14" should be --semi-trailer 14--

Col. 6, line 42, claim 3, "stabilization" should be --stabilizing--

Col. 6, line 43, claim 3, "stabilization" should be --stabilizing--

Col. 6, line 43, claim 3, "stabilizing" should be --stabilization--

Col. 6, line 44, claim 3, "stabilizing" should be --stabilization--

Signed and Sealed this

Twenty-fourth Day of April, 2001

Attest:

NICHOLAS P. GODICI

Attesting Officer

Acting Director of the United States Patent and Trademark Office